United States Patent Office 3,794,562
Patented Feb. 26, 1974

3,794,562
PROCESS FOR THE ENRICHMENT OF PROTEINS USING POLYETHYLENE-IMINE
Hans Ulrich Bergmeyer and Gotthilf Naher, Tutzing, Upper Bavaria, Gunter Weimann, Percha, Upper Bavaria, and Waldemar Thum, Tutzing-Unterzeismering, Germany, assignors to Boehringer Mannheim G.m.b.H
No Drawing. Continuation of application Ser. No. 101,158, Dec. 23, 1970. This application Nov. 13, 1972, Ser. No. 306,124
Claims priority, application Germany, Jan. 16, 1970, P 20 01 902.7
Int. Cl. C07g 7/02
U.S. Cl. 195—66 R                                 12 Claims

ABSTRACT OF THE DISCLOSURE

Dissolved proteins are enriched by use of polyethyleneimine, in enrichment processes such as precipitation, purification and fractionation of proteins.

---

This application is a continuation of application Ser. No. 101,158, filed Dec. 23, 1970, and now abandoned.

The present invention is concerned with a process for the enrichment of proteins.

Within the scope of the present invention, the expression "enrichment of proteins" is intended to embrace processes, such as precipitation, purification and fractionation of proteins, which result in altering the concentration, purity, or type of protein between "un-enriched" and "enriched" mixtures.

Several agents and processes are already known for the enrichment of proteins, especially proteins from biological material. Examples of agents for this purpose include ammonium sulfate, inorganic gels and activated charcoal and examples of processes for to effect enrichment include chromatography on exchangers and molecular sieves.

However, the absence of possibilities of variation in the separation or purification is frequently disadvantageous, because of the extraordinary multiplicity of the naturally-occurring proteins and of their accompanying materials. Of the limited number of processed and agents available for the enrichment of proteins, most prove to be only of limited utility in one particular case, the result of which is that frequently the same purification step must be repeated with another agent and/or process in order to be able to achieve a reasonably satisfactory enrichment. In most cases, the degree of enrichment achieved is low and the subsequent removal of the agent used for the enrichment necessitates the use of special operations, evaporation of large volumes of liquid and the like. Therefore, by and large, the various known processes for the enrichment of proteins always exhibit the same process steps which are repeated continuously with great similarity.

Thus, there exists a need for a process for the enrichment of proteins which permits a better variation in its application to different proteins from different sources and, therefore permits a more effective carrying out of protein enrichment.

The present invention provides a process for the enrichment of dissolved proteins, especially of enzymatically-active proteins, which is flexible and applicable to different proteins and impurities and thus overcomes the disadvantages of the prior art.

Essentially, the process of the invention comprises the use of polyethylene-imine in enrichment processes, as will be detailed below.

It is already known to use polyethylene-imine as a flocculation adjuvant, for example, for the clarification of waste water, for the improvement of the filterability of precipitates and the like. Furthermore, it has already been suggested to use polyethylene-imine (which has been rendered insoluble) in the manner of an ion exchanger for the chromatography of nucleic acids. In addition, polyethylene-imine is used as an adhesion agent in various branches of industry, for example, for fibres, dyes, adhesives, lacquers and the like. However, a knowledge of these various uses would not suggest that water-soluble polyethylene-imine would be particularly suitable for the enrichment of dissolved proteins.

According to the present invention, there can be used the various commercially available types of polyethylene-imine from weakly basic via average basic to strongly basic. The separation effect which can be achieved depends, to a certain extent, upon the molecular weight of the polyethylene-imine so that, with certain molecular weights, depending upon the particular protein, especially favorable enrichment effects can often be achieved. In principle, there have proved to be useful all the polyethylene-imines which have been investigated, for example, those with molecular weights between 600 and 100,000 and above, corresponding to Brookfield viscosities of from 500 to 25,000 cps. at 25° C. The conventionally modified polyethylene-imines, for example partially or completely ethoxylated polyethylene-imines, can also be used.

When using the process according to the present invention for the precipitation of proteins, the protein solution is mixed with a small amount of polyethylene-imine, whereupon the protein precipitates out. The precipitation takes place at a low ion concentration and high dilution with regard to the polyethylene-imine. By increasing the ion concentration, the precipitated protein can again be brought into solution. In this case, there usually remains behind a precipitate which is enriched in polyethyleneimine but depleted in the desired, for example active, protein. The precipitation is dependent upon the pH range and generally takes place at a pH between 5.0 and 9.0, preferably at a pH between 5.5 and 8.5. Above and below these limiting pH values, precipitated protein normally goes into solution again.

The separation of the precipitate containing protein and polyethylene-imine can take place according to the methods normally used for the enrichment of proteins. For example, the polyethylene-imine can be separated on cation exchangers or, on the contrary, the protein can be separated on anion exchangers. Further examples of possible separation methods include ammonium sulfate precipitation, precipitation with organic solvents and molecular sieve separation, especially when the polyethylene-imine used has, in comparison with the precipitated protein, a very large or a very small molecular weight.

Within the scope of the present invention, the term "enrichment" also includes the purification of proteins. The purification can consist of a precipitation, such as has been described above, in which certain impurities remain behind in a dissolved state. A further possibility of purification is a so-called negative precipitation. In this case, by the addition of the polyethylene-imine, the impurities are first precipitated, whereas the desired protein remains in the supernatant and, for example, after separation of the first precipitate, is separately precipitated out. Furthermore, the term "purification" also includes the total precipitation not only of ballast materials but also of proteins and subsequent selective redissolving of only the desired protein, whereas the ballast materials, as well as possibly inactive proteins, remain behind in the precipitate. For example, ballast materials can be precipitated out, as explained hereinafter in more detail, at high ion concentrations at which the desired protein or proteins remains or remain in solution. When, subsequently, the ion concentration is reduced, then the proteins also precipitate out.

Finally, according to the present invention, the term "enrichment" is also to be regarded as including "fractionation." Fractionation is the separation of inactive proteins from desired active proteins. Inactive proteins are here to be understood to include proteins which are themselves active but which are not desired in particular cases or which do not have the required activity. The fractionation takes place by the addition of increasing amounts of polyethylene-imine, the various proteins thereby precipitating out one after the other with a surprisingly good separation effect.

By ballast materials, i.e. those materials which, in the purification step, within the meaning of the present invention, are to be separated from active proteins, there are to be understood nucleic acids, cell wall components, such as polyuronic acids and the like, and plasma components other than the desired proteins themselves.

An especial advantage of the process according to the present invention is that only very small amounts of polyethylene-imine need to be added in order to be able to achieve the desired separation effects. Thus, in the case of low salt concentrations, amounts frequently suffice of the order of 0.005 to 1 volume percent of a 10% polyethylene-imine solution in water in order to be able to achieve complete precipitation or fractionation of certain proteins. On the other hand, for the precipitation of ballast materials at relatively high salt activities in the solution, considerably greater amounts of polyethylene-imine solution are to be added, for example, 15–20 volume percent of a 10% solution or even more. The process according to the present invention is extraordinarily mild and proceeds, therefore, with the best possible maintenance of the activity of the protein. As the following examples show, in the case of negative enrichment steps, there can be achieved activity yields of up to 100%, whereas in the case of positive enrichment steps, i.e. with precipitation of the particular protein wanted, activity yields of up to 90% can be achieved.

The following examples, given for the purpose of illustrating the present invention, are not to be construed or limitative.

EXAMPLE 1

Separation of albumin and ribonucleic acid (RNS) by means of polyethylene-imine (PEI) with a molecular weight about 50,000

500 mg. serum alubumin (corresponding to 400 mg. protein according to the biuret method) and 500 mg. ribonucleic acid were dissolved in 50 ml. 0.05 M phosphate buffer (pH 7.0) and the pH value then adjusted to 7.0 again with 2 N sodium hydroxide solution. By the stepwise addition of polyethylene-imine (molecular weight 50,000; 10% solution; pH 7.0), only the RNS precipitates out but not the alubumin. By reduction of the buffer molarity by dilution with water, the albumin fiinally precipitates out (see Table 1).

TABLE 1.—SEPARATION OF RNS AND ALBUMIN BY MEANS OF PEI

| Vol. percent polyethylene imine: | Phosphate M | Mg. RNS in supernatant | Mg. protein in supernatant |
|---|---|---|---|
| 0 | 0.05 | 500 | 400 |
| 3 | 0.05 | 275 | 390 |
| 6 | 0.05 | 75 | 290 |
| 9 | 0.05 | 50 | 380 |
| 12 | 0.05 | 30 | 380 |
| 15 | 0.05 | 30 | 380 |
| 3 | [1] 0.01 | 5 | 40 |

[1] The supernatant of the precipitation with 15 vol. percent PEI was appropriately diluted with water.

EXAMPLE 2

Isolation of glucoe-6-phosphate-dehydrogenase (G–6–PDH) from Bakers' yeast 340 g. dried bakers' yeast were suspended in 1 liter desalinated water containing 20 g. disodium hydrogen phoshate dodecahydrate and 370 mg. Trilon and then incubated for 4 hours at 38° C. Thereafter, 1 liter water with a temperature of 4° C. was added and the mixture stirred and centrifuged. The supernatant obtained contains, besides other yeast components, G–6–PDH and hexokinase. 0.12 volumes polyethylene-imine (PEI) (molecular weight about 50,000; 10% solution in water; pH 7.0) were then slowly added. A precipitate was formed which contains the nucleic acids and the proteases. The PEI precipitation can also be carried out directly on the yeast incubation liquid without previous centrifuging. The PEI precipitate was coarsely flocculated and can be very readily centrifuged, together with burst yeast cells. The enzyme solution (supernatant) pre-purified in this manner was adjusted with solid ammonium sulfate to 3.05 M, the precipitate obtained containing the two enzymes. After centrifuging, the precipitate was taken up with $2.10^{-2}$ M magnesium chloride solution, containing $1.10^{-3}$ M Trilion and $1.10^{-3}$ M sodium azide (pH 6.5), and dialysed for 12 hours against tap water.

As a further purification step, the dialysate (about 2.0 liters; 0.01 M ammonium sulfate content) are mixed with 0.010–0.020 volumes of the above PEI solution so that just about 5% of the G–6–PDH remains in the supernatant. This operation was carried out at a pH between 6.0 and 7.5, preferably at a pH of 7.0. The supernatant obtained was discarded.

The PEI-enzyme precipitate was suspended in a 0.01 M phosphate buffer (pH 7.6) and centrifuged; the wash water contains about 2% of the enzyme activity.

For elution, there was used a 0.03 M phosphate buffer (pH 7.6), stirring at ambient temperature for about 15 minutes and then centrifuging. The supernatant contains about 50–60% of the G–6–PDH activity, referred to the activity after dialysis. In this step, the G–6–PDH was enriched sevenfold (see Table 2).

TABLE 2

[Positive PEI step in the G–6–PDH process]

| Step | U./mg. protein [1] | Percent | U./gm. protein [2] | Percent |
|---|---|---|---|---|
| After dialysis | 0.53 | 100 | 0.50 | 100 |
| PEI supernatant | | 16 | | 1.47 |
| Washing 0.01 M; pH 7.6 | | 1.8 | | 0.70 |
| Eluate 0.03 M; pH 7.6 | 3.8 | 45 | 2.92 | 53 |

[1] 0.85% PEI addition of a 100% solution, pH 7.0.
[2] 1.23% PEI addition of a 100% solution, pH 7.0.

EXAMPLE 3

Isolation of hexokinase (HK) from bakers' yeast

The process according to Example 2 was repeated up to the production of a dialysate.

About 2.0 liters of dialysate with a 0.01 M ammonium sulfate content was mixed with 0.009 volumes of polyethyleneimine (PEI) (molecular weight about 50,000; pH 7.0; 10% solution in water) so that about 10% of the HK activity still remains in the supernatant. For washing, the PEI–HK precipitate was suspended in a 0.01 M phosphate buffer (pH 7.6) and centrifuged. The wash water was discarded.

The enzyme precipitate was taken up with 0.025 M phosphate buffer (pH 7.6), stirred for 15 minutes at ambient temperature and subsequent centrifuged. The supernatant contains about 40% of the HK activity, referred to the dialysate. The purification in this step was about fourfold (see Table 3).

TABLE 3
[Positive PEI step in the case of HK]

| Step | U./mg. protein | Percent |
| --- | --- | --- |
| After dialysis | 2.46 | 100 |
| PEI supernatant | 0.39 | 10.8 |
| Washing 0.01 M; pH 7.6 | | 10.1 |
| Eluate 0.025 M; pH 7.6 | 10.5 | 33.4 |

EXAMPLE 4

Separation of ribonucleic acid (RNS) and proteases (measured with casein as substrate), as well as of hexokinase and glucose - 6 - phosphate-dehydrogenase (G–6–PDH)) by a negative polyethylene-imine step.

100 ml. centrifuged off yeast incubation liquor, obtained in the manner described in Example 2, were mixed stepwise PEI (molecular weight about 50,000; 10% solution; pH 7.0). The molarity of phosphate buffer and of other salts was, altogether, 0.08 M (measured conductivity value, referred to phosphate buffer). Table 4 shows the fractionation achieved with increasing PEI content.

TABLE 4
[Fractionation of RNS and proteases, as well as of KH and G-6-PDH (100 ml. incuabtion liquor)]

| Vol. percent PEI | ε mg. RNS | ε mg. proteases | ε U. HK | ε U G-6-PDH. |
| --- | --- | --- | --- | --- |
| 0 | 185 | 0.350 | $4.3 \times 10^3$ | $7.8 \times 10^2$ |
| 4 | 45 | 0.147 | $4.2 \times 10^3$ | $7.8 \times 10^2$ |
| 8 | 6 | 0.035 | $4.2 \times 10^3$ | $7.6 \times 10^2$ |
| 12 | 15 | 0.020 | $4.2 \times 10^3$ | $7.6 \times 10^2$ |

Thus, RNS and proteases are precipitated out almost completely at 8–12 volume percent PEI, whereas HK and G–6–PDH remain, practically without loss, in the supernatant.

EXAMPLE 5

Glucose-oxidase from *Aspergillus niger*

1 kg. pressed mycelia of *Aspergillus niger* were stirred up with 2 liters completely desalinated water and homogenised at 300–400 ats. by high pressure dispersion.

The homogenisate was mixed with 0.2 volume percent of a 10% solution of PEI (molecular weight 1800; pH 7.0–7.5) and, after stirring for about 30 minutes, filtered off. The clear filtrate contains the glucose oxidase, the ballast materials being in the precipitate which was separated off and discarded.

The salt-poor supernatant (conductivity at 20° C. about $2 \times 10^3 \mu$ Siemens) was mixed with 0.1 volume percent of a 10% PEI solution (molecular weight 30,000–60,000) at pH 7.0–7.5. After stirring for about 30 minutes, in the clear-filtered supernatant there remain <8% of the activity of the glucose oxidase.

The precipitate was homogenized with 0.03 M potassium phosphate buffer (pH 7.6), stirred for 10 minutes and centrifuged clear. The inactive precipitate was discarded and the supernatant was frozen and lyophilized. Table 5 shows the purification and the yield obtained in each individual step.

TABLE 5

| Working up | Volume in ml. | U. | Mg. dry weight[1] | U./mg. dry wt. | Yield, percent |
| --- | --- | --- | --- | --- | --- |
| 1. Digestion and extraction | 2,000 | $1.78 \times 10^4$ | 2,900 | 5.35 | 100 |
| 2. Supernatant of ballast materials by PEI (supernatant) | 1,950 | $1.6 \times 10^4$ | 2,240 | 11.5 | 90 |
| 3. Precipitation of glucoseoxidase with PEI (supernatant) | 1,870 | $1.3 \times 10^3$ | | | 8.1 |
| 4. Extraction of glucose oxidase | 140 | $1.15 \times 10^4$ | | | 65 |
| 5. Glucose oxidase after lyophilization | | $1.22 \times 10^4$ | 250 | 48.5 | 68 |

[1] The dry weight determinations took place after exhaustive dialysis against completely desalinated water and subsequent lyophillization.

EXAMPLE 6

Glycerokinase from *Candida mycoderma*

Comparison of the enzyme isolation according to a known process and with the use of polyethylene-imine.

(A) Isolation by a known process.—Extraction of the mycelia:

60 g. of the dried mycelia were extracted for 3 hours at 37° C. in 600 ml. 0.05 M dipotassium hydrogen phosphate, $10^{-2}$ M glycerol and $10^{-3}$ M ethylene-diamine-tetraacetic acid (EDTA). This was then diluted with 600 ml. $10^{-2}$ M glycerol and $10^{-3}$ M EDTA and the mycelia centrifuged off. The precipitate was discarded.

The extract obtained was heated at 60° C. for 60 minutes, cooled to 10° C. and denatured protein centrifuged off.

The supernatant from the heating step was saturated with ammonium sulfate to 3.2 M and the precipitated glycerokinase centrifuged off. The inactive supernatant was discarded. In the precipitate, the glycerokinase was taken up with 0.05 M potassium phosphate buffer (pH 7.6), $10^{-2}$ M glycerol and $10^{-3}$ M EDTA and dialyzed at 0° C. for a total of 14 hours against the same buffer.

(B) Isolation according to the present invention of glycerokinase, with the use of polyethylene-imine.—60 g. of the mycelia were, as described under (A), extracted, diluted and centrifuged.

The clear extract was mixed with 0.3 volume percent of a 10% PEI solution (molecular weight 30,000–60,000) at pH 7.0–7.5. After about 30 minutes stirring, the activity of the glycerokinase remains in the clear centrifuged supernatant.

1 part of supernatant was diluted with 1 part of cold $10^{-2}$ M glycerol and $10^{-3}$ M EDTA solution. 2.75 volume percent of the above 10% PEI solution are then added at pH 7.0–7.5. The supernatant was centrifuged off and discarded.

The precipitate was extracted with 0.05 M potassium phosphate buffer (pH 7.0) and centrifuged. The centrifuged off precipitate was discarded. The glycerokinase in the supernatant was precipitated out by adding ammonium sulfate to 3.2 M. The precipitate was taken up in concentrated form in 0.05 M potassium phosphate buffer (pH 7.0), $10^{-2}$ M glycerol and $10^{-3}$ M EDTA and dialyzed for 14 hours at 0° C. against the same buffer.

The following Table 6 shows the results obtained according to the known process and according to the process of the present invention and demonstrates clearly the superior yields and purification of the process of the present invention. Thus, according to the present invention, with a yield of 57%, there was achieved more than a twelvefold enrichment, whereas the known process only gives a 22% yield and only a 4.5 fold enrichment.

TABLE 6
[Isolation of glycerokinase by the known process (see German patent specification No. 2,238,422)]

| Working step | Volume in ml. | Total units | Total mg. protein | Specific activity in u./mg. protein | Yield in percent |
| --- | --- | --- | --- | --- | --- |
| 1.1 extraction of the mycelia | 1,085 | $7.7 \times 10^3$ | 3,720 | 1.98 | 100 |
| 1.2 heating of the extract | 1,030 | $4.1 \times 10^3$ | 246 | 16.6 | 53.3 |
| 1.3 ammonium sulfate precipitation and dialysis | 50 | $2.1 \times 10^3$ | 236 | 8.9 | 22.3 |
| [Isolation of glycerokinase with the use of polyethylene-imine] | | | | | |
| 2.1 extraction of the mycelia | 1,035 | $7.7 \times 10^3$ | 3,720 | 1.98 | 100 |
| 2.2 separation of ballast materials by polyethyleneimine | 1,000 | $8.0 \times 10^3$ | 2,130 | 3.74 | 104 |
| 2.3 precipitation of glycerokinase with polyethyleneimine dissolved precipitate | 42 | $6.36 \times 10^3$ | 328 | 19.4 | 81.5 |
| 2.4 ammonium sulfate precipitation and dialysis | 28 | $4.39 \times 10^3$ | 180 | 24.2 | 49.5 |

EXAMPLE 7

Diaphorase from pigs' heart

After comminution of 1 kg. frozen pigs' heart, squeezing out of the meat slurry, extraction of the solid residue, heat treatment of the extract thus obtained, ammonium sulfate fractionation up to 3.2 M and dialysis, there was obtained, referred to the protein, a substantially enriched diaphorase which, however, still contains considerable amounts of ballast materials, which cannot be detected as proteins. The polyethylene-imine step was carried out for the removal of these ballast materials.

The dialystate was diluted 1:1 with 0.01 M potassium phosphate buffer (pH 7.0). 0.5 volume percent of a 10% PEI solution (molecular weight 1800; pH adjusted to 7.0 with 2 N sodium hydroxide solution) were then added, the ballast materials thereby precipitating out. The inactive precipitate was centrifuged off and the diaphorase in the supernatant was frozen and lyophilized.

Table 7 shows the values obtained with regard to yield and enrichment.

TABLE 7

| Working step | Specific activity in u./mg. protein | Activity in u./mg. lyophilisate | Yield, percent |
| --- | --- | --- | --- |
| 1. Precipitate 3.2 M ammonium sulfate | 0.70 | | 100 |
| 2. Dialysis | 0.86 | 0.384 | 97 |
| 3. Supernatant after PEI precipitation | 0.9 | 0.657 | 91 |

It will be understood that the foregoing specification and examples are illustrative and not limitative of the present invention in that many other embodiments of the invention will suggest themselves to those skilled in the art.

What is claimed is:

1. Process for the enrichment of enzymatically active dissolved proteins which comprises treating a mixture containing the dissolved protein with a water soluble polyethylene-imine in aqueous solution wherein said polyethylene-imine has an average molecular weight from about 600 to about 100,000 to precipitate out either the protein or impurities contained in said mixture, and recovering the enriched protein.

2. Process as claimed in claim 1 wherein the polyethylene-imine is used in the form of a dilute aqueous solution.

3. Process as claimed in claim 1 wherein the protein is precipitated out upon addition of the polyethylene-imine.

4. Process as claimed in claim 1 wherein impurities in the unenriched protein mixture are first precipitated out upon addition of the polyethylene-imine.

5. Process as claimed in claim 1 wherein said starting protein mixture contains more than one type of protein and a single protein is selectively precipitated out upon addition of the polyethylene-imine.

6. Process as claimed in claim 1 wherein the process is carried out at a pH between 5.0 and 9.0.

7. Process as claimed in claim 6 wherein the pH is between 5.5 and 8.5.

8. Process as claimed in claim 1 wherein the desired protein is precipitated out upon addition of the polyethylene-imine at a low ion concentration, together with the impurities contained in said mixture, whereafter the ion concentration is increased to selectively bring the desired protein back into solution.

9. Process as claimed in claim 1 wherein the impurities are first precipitated out at a high ion concentration, the precipitate is removed and the ion concentration is then lowered to bring about precipitation of the desired protein.

10. Process as claimed in claim 1 wherein the polyethylene-imine is added in gradually increasing amount to cause fractional precipitation of the components of said protein mixture.

11. Process as claimed in claim 1 wherein said protein mixture contains plurality of enzymatically active proteins wherein the non-desired proteins are first precipitated out upon addition of the polyethylene-imine, leaving the desired protein in solution.

12. Process as claimed in claim 1 wherein the polyethylene-imine is used in amounts from 0.005 to 20 volume percent, based on total volume of the unenriched mixture to be treated, of a 10 percent polyethylene-imine solution in water.

References Cited

UNITED STATES PATENTS

| | | | |
| --- | --- | --- | --- |
| 3,142,638 | 7/1964 | Blaisdell | 210—52 |
| 3,259,569 | 7/1966 | Priesing | 210—46 |

OTHER REFERENCES

Biophysical Chemistry, 1958, pp. 263–264, 275–278, 316, Edsall et al.

Kirk, et al.: Encyclopedia of Chemical Technology, vol. 8, 1965, pp. 198–199, and vol. 11, 1967, p. 541.

Chem. Abstracts, vol. 48, 1954, 9578 a-b, Deuel et al.

HOWARD E. SCHAIN, Primary Examiner

U.S. Cl. X.R.

260—112 R, 122